(12) United States Patent
Miao et al.

(10) Patent No.: US 12,745,310 B2
(45) Date of Patent: Sep. 22, 2026

(54) METHOD, DEVICE AND COMPUTER READABLE MEDIUM FOR COMMUNICATIONS

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 403 days.

(21) Appl. No.: 18/037,212

(22) PCT Filed: Nov. 17, 2020

(86) PCT No.: PCT/CN2020/129447
§ 371 (c)(1),
(2) Date: May 16, 2023

(87) PCT Pub. No.: WO2022/104541
PCT Pub. Date: May 27, 2022

(65) Prior Publication Data

US 2024/0023190 A1 Jan. 18, 2024

(51) Int. Cl.
*H04W 4/00* (2018.01)
*H04W 76/14* (2018.01)
(Continued)

(52) U.S. Cl.
CPC .......... *H04W 76/27* (2018.02); *H04W 76/14* (2018.02); *H04W 92/18* (2013.01)

(58) Field of Classification Search
CPC ..... H04W 76/27; H04W 76/14; H04W 92/18; H04W 8/005; H04W 72/02; H04W 76/28;
(Continued)

(56) References Cited

U.S. PATENT DOCUMENTS

2019/0132832 A1 5/2019 Uchiyama et al.
2019/0174503 A1 6/2019 Adachi et al.
(Continued)

FOREIGN PATENT DOCUMENTS

CN 111434152 A 7/2020
CN 111585707 A 8/2020
(Continued)

OTHER PUBLICATIONS

International Search Report for PCT/CN2020/129447 dated Aug. 6, 2021.

(Continued)

*Primary Examiner* — Phuongchau Ba Nguyen
(74) *Attorney, Agent, or Firm* — Sughrue Mion, PLLC

(57) ABSTRACT

Embodiments of the present disclosure relate to a method, device and computer readable media for communications. A method comprises receiving, at a first terminal device from a second terminal device, first sidelink control information and a first reference signal associated with the first sidelink control information during an on-duration of a discontinuous reception cycle. The method also comprises in accordance with a determination that an overlapping period exists between an off-duration of the discontinuous reception cycle and a sensing window, determining an available candidate resource in a resource selection window for a first sidelink transmission based at least on the first sidelink control information and the first reference signal.

2 Claims, 8 Drawing Sheets

800 - process
810 - determine whether overlapping period exists between an off-duration of a DRX cycle and a sensing window
820 - first terminal device 110 determines an available candidate resource in a resource selection window for a first sidelink transmission
830 - first terminal device 110 transmits a request for the information for resource selection
840 - first terminal device 110 receives a response to the request from the third terminal device 130
900 – process
910 - first terminal device 110 determines whether an overlapping period exists between an off-duration of a DRX cycle and a sensing window
920 - first terminal device 110 receives SCI and a reference signal in a second sensing window
930 - first terminal device 110 determines an available candidate resource in a resource selection window for a first sidelink transmission

(51) Int. Cl.
*H04W 76/27* (2018.01)
*H04W 92/18* (2009.01)

(58) Field of Classification Search
CPC ... H04W 28/04; H04W 72/04; H04W 72/042; H04W 88/08; H04W 28/08; H04W 28/084; H04W 36/22; H04W 72/12; Y02D 30/70; H04L 5/0007
See application file for complete search history.

(56) References Cited

U.S. PATENT DOCUMENTS

| | | | | |
|---|---|---|---|---|
| 2020/0029340 | A1* | 1/2020 | He | H04W 72/25 |
| 2020/0084714 | A1 | 3/2020 | Medles et al. | |
| 2020/0314804 | A1* | 10/2020 | Shin | H04L 5/0055 |
| 2020/0344743 | A1 | 10/2020 | Uchiyama et al. | |
| 2021/0037468 | A1* | 2/2021 | Huang | H04W 72/044 |
| 2022/0110055 | A1* | 4/2022 | Hosseini | H04W 52/0229 |
| 2022/0132486 | A1* | 4/2022 | Aktas | H04W 72/541 |
| 2022/0417923 | A1 | 12/2022 | Uchiyama et al. | |
| 2023/0131353 | A1* | 4/2023 | Miao | H04W 72/40 370/329 |
| 2023/0232374 | A1* | 7/2023 | Lee | H04W 52/0219 370/329 |
| 2023/0276526 | A1* | 8/2023 | Shin | H04W 76/23 370/329 |
| 2023/0337193 | A1* | 10/2023 | Farag | H04W 72/02 |
| 2024/0260131 | A1* | 8/2024 | Yue | H04W 52/0216 |

FOREIGN PATENT DOCUMENTS

| | | | |
|---|---|---|---|
| JP | 2017-208796 | A | 11/2017 |
| WO | 2018/030306 | A1 | 2/2018 |

OTHER PUBLICATIONS

JP Office Action for JP Application No. 2023-530013, mailed on Feb. 4, 2025 with English Translation.
Huawei, HiSilicon, “Physical layer impacts of sidelink DRX”, 3GPP TSG RAN WG1 #103-e R1-2008332, Nov. 13, 2020, pp. 1-pp. 6.
JP Office Action for JP Application No. 2023-530013, mailed on Jul. 8, 2025 with English Translation.
InterDigital, Inc., “On multi-carrier and DRX operation for SL”, 3GPP TSG RAN WG1 #103-e R1-2009123, Nov. 13, 2020.
ZTE Corporation, Sanechips, “Potential impact of DRX enhancement to RAN1 discussion”, 3GPP TSG RAN WG1 #103-e R1-2008880, Nov. 13, 2020.

* cited by examiner

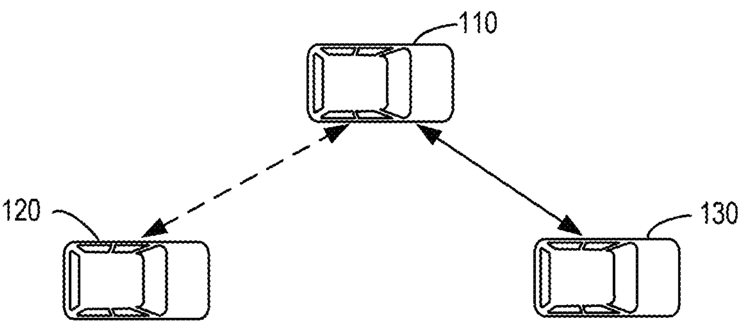

Fig. 1

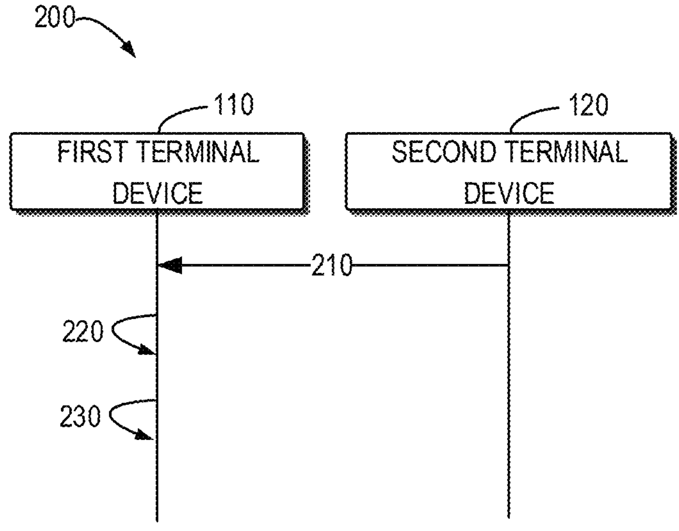

Fig. 2

100 – communications network
110 – first terminal device
120 – second terminal device
130 – third terminal device
200 – process
210 – first terminal device receives first SCI and a first reference signal associated with the first SCI during an on-duration of a DRX cycle
220 – first terminal device 110 determines whether an overlapping period exists between an off-duration of the discontinuous reception cycle and a sensing window
230 – first terminal device 110 determines an available candidate resource in a resource selection window for a first sidelink transmission based at least on the first SCI and the first reference signal 310 - resource selection window 311 - resource 320 - sensing window 321, 322, 323 - sensing occasions 324, 325 – slots 326 - sensing occasion 330 - DRX cycle 310 - resource selection window
320 - sensing window
341 – resource R1
342 – resource R2
343 – resource R3
344 – resource R4
345 – resource R5
346 – resource R6

310 - resource selection window
320 - sensing window
347 - resource R7
348 - resource R8
349 - resource R9
350 - resource R10
351 - resource R11
352 - resource R12
353 - resource R13
354 - resource R14

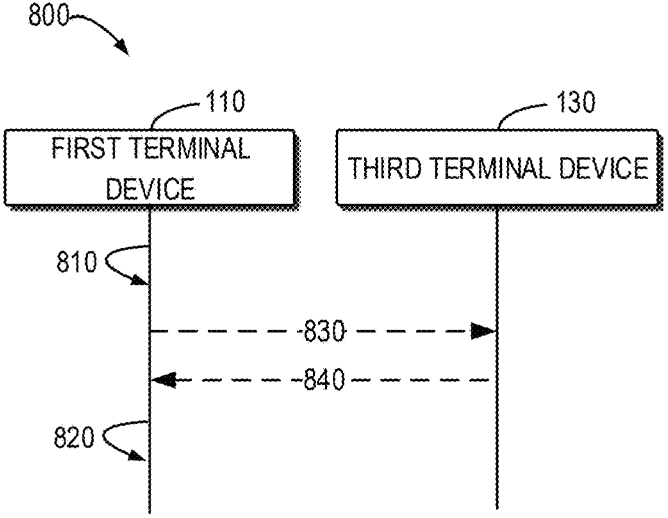

Fig. 8

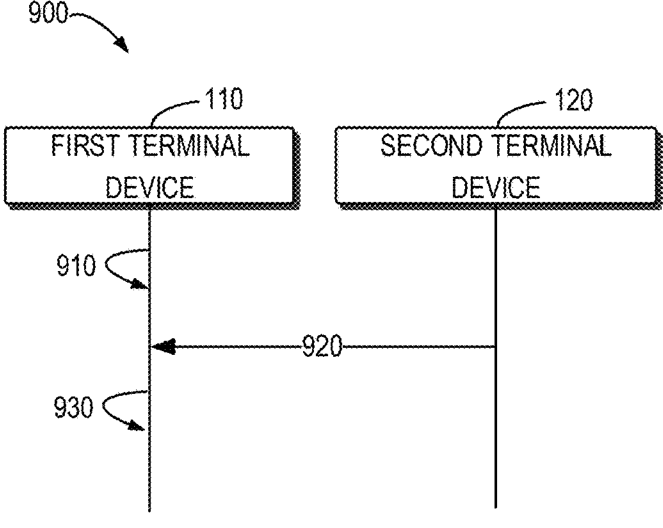

Fig. 9

800 - process

810 - determine whether overlapping period exists between an off-duration of a DRX cycle and a sensing window 820 - first terminal device 110 determines an available candidate resource in a resource selection window for a first sidelink transmission 830 - first terminal device 110 transmits a request for the information for resource selection 840 - first terminal device 110 receives a response to the request from the third terminal device 130

900 – process

910 - first terminal device 110 determines whether an overlapping period exists between an off-duration of a DRX cycle and a sensing window 920 - first terminal device 110 receives SCI and a reference signal in a second sensing window 930 - first terminal device 110 determines an available candidate resource in a resource selection window for a first sidelink transmission 370 – sensing window
371 – R15 resource
372 – R16 resource
380 – resource selection window 1400 – device
1440 – receiver (RX)
1450 – processing means

METHOD, DEVICE AND COMPUTER READABLE MEDIUM FOR COMMUNICATIONS

CROSS REFERENCE TO RELATED APPLICATIONS

This application is a National Stage of International Application No. PCT/CN2020/129447 filed Nov. 17, 2020.

TECHNICAL FIELD

Embodiments of the present disclosure generally relate to the field of telecommunication, and in particular, to a method, device and computer readable medium for resource selection in Discontinuous Reception (DRX).

BACKGROUND

DRX is a method for reducing power consumption by allowing a communication device to discontinuously receive information from another communication device. The DRX may be configured for a terminal device in vehicle to everything (V2X) use cases or in public safety and commercial use cases where power consumption needs to be minimized.

In V2X communications, the terminal device may autonomously select resources in a resource pool for a sidelink transmission by performing full sensing or partial sensing. When the DRX is configured, the terminal device may get into an active status during an on-duration of a DRX cycle to monitor and decode a control channel. During an off-duration of the DRX cycle, the terminal device may get into an inactive status where the monitoring and decoding are not performed. Thus, the terminal device may acquire inaccurate sensing results. As a result, resource collisions may occur.

SUMMARY

In general, example embodiments of the present disclosure provide a method, device and computer readable medium for communications.

In a first aspect, there is provided a method for communications. The method comprises receiving, at a first terminal device from a second terminal device, first sidelink control information and a first reference signal associated with the first sidelink control information during an on-duration of a discontinuous reception cycle. The method also comprises in accordance with a determination that an overlapping period exists between an off-duration of the discontinuous reception cycle and a sensing window, determining an available candidate resource in a resource selection window for a first sidelink transmission based at least on the first sidelink control information and the first reference signal.

In a second aspect, there is provided a method for communications. The method comprises determining, at a first terminal device, whether an overlapping period exists between an off-duration of a discontinuous reception cycle and a sensing window. The method also comprises in accordance with the determination that the overlapping period exists, determining an available candidate resource in a resource selection window for a first sidelink transmission based on information for resource selection received from a third terminal device.

In a third aspect, there is provided a method for communications. The method comprises in accordance with a determination that an overlapping period exists between an off-duration of a first discontinuous reception cycle and a first sensing window, receiving, at a first terminal device from a second terminal device, sidelink control information and a reference signal in a second sensing window. The second sensing window is within an on-duration of a second discontinuous reception cycle subsequent to the first discontinuous reception cycle. The method also comprises determining an available candidate resource in a resource selection window for a first sidelink transmission based at least on the first sidelink control information and the reference signal. The resource selection window is subsequent to the second sensing window and within the on-duration.

In a fourth aspect, there is provided a terminal device. The terminal device comprises a processor and a memory storing instructions. The memory and the instructions are configured, with the processor, to cause the terminal device to perform the method according to the first aspect.

In a fifth aspect, there is provided a terminal device. The terminal device comprises a processor and a memory storing instructions. The memory and the instructions are configured, with the processor, to cause the terminal device to perform the method according to the second aspect.

In a sixth aspect, there is provided a terminal device. The terminal device comprises a processor and a memory storing instructions. The memory and the instructions are configured, with the processor, to cause the terminal device to perform the method according to the third aspect.

In a seventh aspect, there is provided a computer readable medium having instructions stored thereon. The instructions, when executed on at least one processor of a device, cause the device to perform the method according to the first aspect.

In an eighth aspect, there is provided a computer readable medium having instructions stored thereon. The instructions, when executed on at least one processor of a device, cause the device to perform the method according to the second aspect.

In a ninth aspect, there is provided a computer readable medium having instructions stored thereon. The instructions, when executed on at least one processor of a device, cause the device to perform the method according to the third aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 1 illustrates an example communication network in which implementations of the present disclosure can be implemented;

FIG. 2 illustrates an example signaling chart showing an example process for resource selection in accordance with some embodiments of the present disclosure;

FIG. 8 illustrates an example signaling chart showing an example process for resource selection in accordance with some other embodiments of the present disclosure;

FIG. 9 illustrates an example signaling chart showing an example process for resource selection in accordance with still other embodiments of the present disclosure;

Throughout the drawings, the same or similar reference numerals represent the same or similar element.

DETAILED DESCRIPTION

Figure 3A:
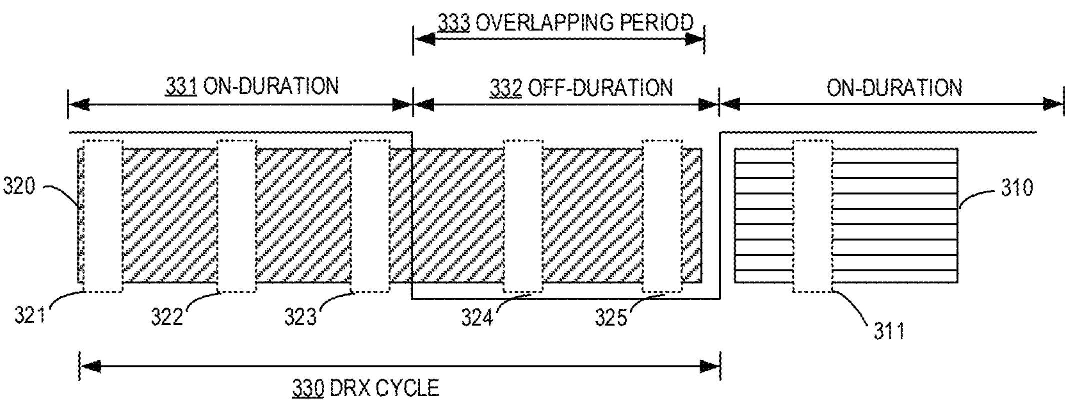
FIG. 3A illustrates a schematic diagram showing partial sensing and DRX configuration in accordance with some embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

During an off-duration of the DRX cycle, the terminal device may get into an inactive status where the monitoring and decoding are not performed. Thus, the terminal device may acquire inaccurate sensing results. As a result, resource collisions may occur.

Embodiments of the present disclosure provide a solution for resource selection in DRX, so as to solve the above problems and one or more of other potential problems. According to the solution, a first terminal device receives, from a second terminal device, sidelink control information (SCI) and a reference signal associated with the SCI during an on-duration of a DRX cycle. If the first terminal device determines that an overlapping period exists between an off-duration of the discontinuous reception cycle and a sensing window, the first terminal device determines an available candidate resource in a resource selection window for a sidelink transmission based at least on the SCI and the reference signal. In this way, the first terminal device may acquire accurate sensing results. As a result, resource collisions may be avoided.

FIG. 1 illustrates a schematic diagram of an example communication network 100 in which embodiments of the present disclosure can be implemented. As shown in FIG. 1, the communication network 100 may include a first terminal device 110, a second terminal device 120, and a third terminal device 130. It should be understood that the communication network 100 may further include a network device (not shown). The network device may communicate with the first terminal device 110, the second terminal device 120 and the third terminal device 130 via respective wireless communication channels. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

In FIG. 1, the first terminal device 110, the second terminal device 120 and the third terminal device 130 are shown as vehicles which enable V2X communications. It is to be understood that embodiments of the present disclosure are also applicable to other terminal devices than vehicles, such as mobile phones, sensors and so on.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 2 illustrates an example signaling chart showing an example process 200 for resource selection in accordance with some embodiments of the present disclosure. As shown in FIG. 2, the process 200 may involve the first terminal device 110 and the second terminal device 120 as shown in FIG. 1. It is to be understood that the process 200 may include additional acts not shown and/or may omit some acts as shown, and the scope of the present disclosure is not limited in this regard. In addition, it will be appreciated that, although primarily presented herein as being performed serially, at least a portion of the acts of the process 200 may be performed contemporaneously or in a different order than as presented in FIG. 2.

As shown in FIG. 2, the first terminal device 110 receives (210), from the second terminal device 120, first SCI and a first reference signal associated with the first SCI during an on-duration of a DRX cycle.

In some example embodiments, the first terminal device 110 may receive the first SCI on a Physical Sidelink Control Channel and the first reference signal on a Physical Sidelink Control Channel or associated Physical Sidelink Shared Channel.

The first terminal device 110 determines (220) whether an overlapping period exists between an off-duration of the discontinuous reception cycle and a sensing window.

If the first terminal device 110 determines that the overlapping period exists, the first terminal device 110 determines (230) an available candidate resource in a resource selection window for a first sidelink transmission based at least on the first SCI and the first reference signal. In this way, the first terminal device 110 may acquire accurate sensing results. As a result, resource collisions between the first terminal device 110 and the second terminal device 120 may be avoided.

In some example embodiments, the first reference signal may comprise a demodulation reference signal (DMRS). The first terminal device 110 may decode the first SCI by channel estimation using the DMRS.

In some example embodiments, if the first terminal device 110 is configured with both partial sensing and DRX, the first terminal device 110 may be expected to be configured with candidate sensing occasions that are only within the on-duration of the DRX cycle. This will be described with reference to FIG. 3A.

FIG. 3A illustrates a schematic diagram showing partial sensing and DRX in accordance with some embodiments of the present disclosure. As shown in FIG. 3A, the first terminal device 110 is configured with partial sensing. In order to perform the partial sensing, a protocol layer of the first terminal device 110 higher than a physical layer of the first terminal device 110 will configure the physical layer with the minimum number of candidate resources to be selected in a resource selection window 310. Hereinafter, for the purpose of discussion, the protocol layer higher than the physical layer is also referred to as a higher layer. For example, the higher layer may comprise a Media Access Control (MAC) layer or a radio resource control (RRC) layer. The number may be any value and the scope of the present disclosure is not limited thereto. For example, in the example as shown in FIG. 3A, the number of candidate resources is one. As such, the physical layer determines one candidate resource 311 in the resource selection window 310.

In addition, the higher layer will configure the physical layer with candidate sensing occasions in a sensing window 320. In some example embodiments, the candidate sensing occasions may be indicated by a parameter gapCandidateSensing from the higher layer. The parameter gapCandidateSensing may be in a form of bitmap. A bit in the bitmap is set to be "1" indicating that a corresponding slot is configured as a candidate sensing occasion. Instead, a bit in the bitmap is set to be "0" indicating that a corresponding slot is not configured as a candidate sensing occasion. For example, in the example as shown in FIG. 3A, the bitmap may be "11100" indicating that slots 321, 322 and 323 are configured as candidate sensing occasions and slots 324 and 325 are not configured as candidate sensing occasions.

It should be understood that the above bitmap including five bits is described just for example. The bitmap may include more or less bits based on the number of candidate sensing occasion.

The first terminal device 110 is also configured with DRX. For example, a DRX cycle 330 includes an on-duration 331 and an off-duration 332. All of the candidate sensing occasions 321, 322 and 323 are within the on-duration 331. An overlapping period 333 exists between the off-duration 332 and the sensing window 320. At the candidate sensing occasions 321, 322 and 323, the first terminal device 110 monitors a sidelink control channel to receive, from the second terminal device 120, the first SCI and the first reference signal.

In turn, the first terminal device 110 determines an available candidate resource in the resource selection window 310 based at least on the first SCI and the first reference signal. For example, the first terminal device 110 may determine a resource reservation period P_rx of the second terminal device 120 based on the first SCI. Further, the first terminal device 110 may determine the resource 311 based on the sensing occasions 321, 322 and 323 and the resource reservation period P_rx. In addition, the first terminal device 110 may measure a reference signal received power (RSRP) of the first reference signal. Then, the first terminal device 110 may compare the measured RSRP with a threshold RSRP. If the measured RSRP is higher than the threshold RSRP, the first terminal device 110 may determine the one or more subchannels within the resource 311 is reserved by the second terminal device 120 for a sidelink transmission of the second terminal device 120 occurred in corresponding one or more subchannels within slot resources 321, 322 or 323. In turn, the first terminal device 110 may determine a resource in the resource 311 that is different from the one or more subchannels in the resource 311 as the available candidate resource for the first sidelink transmission of the first terminal device 110.

In the example as shown in FIG. 3A, because the first terminal device 110 does not perform sensing or partial sensing during the off-duration 332, power consumption of the first terminal device 110 may be reduced.

Figure 3B:
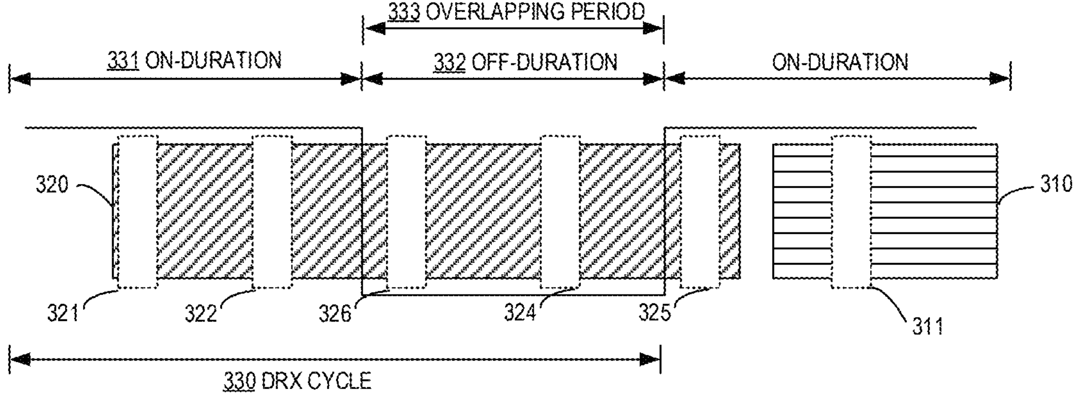
FIG. 3B illustrates a schematic diagram showing partial sensing and DRX configuration in accordance with some other embodiments of the present disclosure.

FIG. 3B illustrates a schematic diagram showing partial sensing and DRX in accordance with some other embodiments of the present disclosure. Different from the example as shown in FIG. 3A, in the example as shown in FIG. 3B, some of candidate sensing occasions indicated by the bitmap from the higher layer are within the on-duration 331 and others are within the off-duration 332. For example, the bitmap may be "11100" indicating that slots 321, 322 and 326 are configured as candidate sensing occasions and the slots 324 and 325 are not configured as candidate sensing occasions. Among the candidate sensing occasions 321, 322 and 326, the candidate sensing occasions 321 and 322 are within the on-duration 331 and the sensing occasion 326 is within the off-duration 332. In such example, only at the candidate sensing occasions 321 and 322 within the on-duration 331, the first terminal device 110 monitors the sidelink control channel to receive, from the second terminal device 120, the first SCI and the first reference signal.

In addition, in the example as shown in FIG. 3B, the physical layer of the first terminal device 110 may transmit, to the higher layer, an indication that the candidate sensing occasion 326 during the overlapping period 333 is unavailable. For example, the indication may be in a form of bitmap. A bit in the bitmap is set to be "1" indicating that a corresponding candidate sensing occasion is unavailable. For example, in the example as shown in FIG. 3B, the bitmap may be "00100" indicating that the candidate sensing occasion 326 is unavailable.

Upon receiving the indication, the higher layer may avoid indicating the third bit as a candidate sensing occasion for subsequent transmissions. Thus, the terminal device may acquire accurate sensing results.

In some example embodiments, in order to obtain an accurate sensing result, the first terminal device 110 may monitor the sidelink control channel during the off-duration of the DRX cycle. This will be described with reference to FIG. 4.

Figure 4:
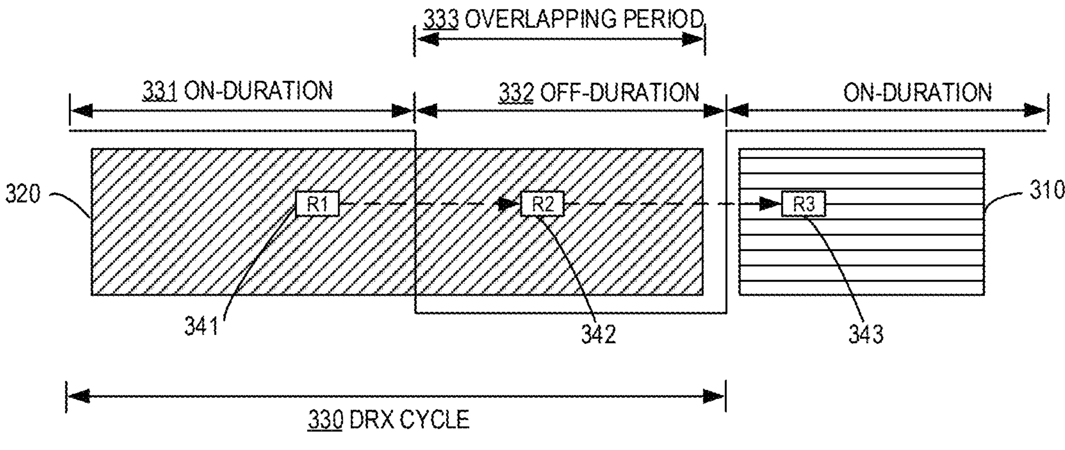
FIG. 4 illustrates a schematic diagram showing sensing and DRX configuration in accordance with some embodiments of the present disclosure.

FIG. 4 illustrates a schematic diagram showing sensing and DRX configuration in accordance with some embodiments of the present disclosure. As shown in FIG. 4, on a resource 341, the first terminal device 110 monitors a sidelink control channel to receive, from the second terminal device 120, the first SCI and the first reference signal. The first terminal device 110 determines, based on the first SCI and the first reference signal, a first resource 342 reserved by the second terminal device 120 for a second sidelink transmission.

If the first terminal device 110 determines that the first resource 342 is within the off-duration 332, the first terminal device 110 receives second SCI and a second reference signal associated with the second SCI on the first resource 342 from the second terminal device 120. In turn, the first terminal device 110 determines the available candidate resource based on the second SCI and the second reference signal. For example, the first terminal device 110 may determine that a resource 343 in the resource selection window 310 is reserved by the second terminal device 120 based on the second SCI and the second reference signal. As such, the first terminal device 110 determines a resource in the resource selection window that is different from the resource 343 as the available candidate resource.

In order to receive the second SCI and the second reference signal on the first resource 342, in some example embodiments, the first terminal device 110 may keep in an active status from a start of the off-duration 332 to an end of the first resource 342. In other words, the first terminal device 110 may keep awake to monitor the sidelink control channel from the start of the off-duration 332 to the end of the first resource 342. In this way, if any other SCI is transmitted by the second terminal device 120, the other SCI may be detected by the first terminal device 110.

Alternatively, in order to receive the second SCI and the second reference signal on the first resource 342, the first terminal device 110 may switch from the inactive status to an active status on the first resource 342 so as to monitor the sidelink control channel. In other words, during the off-duration 332, the first terminal device 110 may only wake up on the first resource 342 to monitor the sidelink control channel and get into asleep after an end of the first resource 342. In this way, power consumption of the first terminal device 110 may be reduced.

In some example embodiments, it may be assumed that potential consecutive resource reservations of the second terminal device 120 are within the off-duration. This will be described with reference to FIG. 5.

Figure 5:
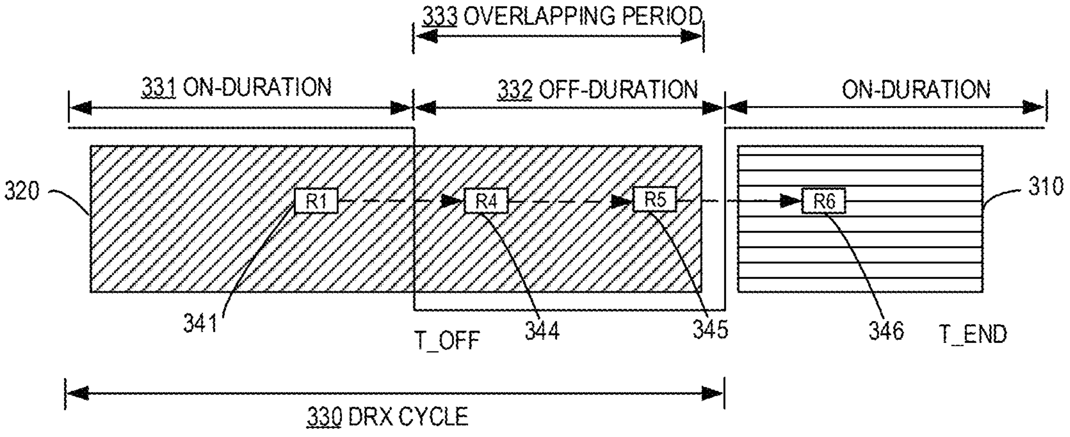
FIG. 5 illustrates a schematic diagram showing sensing and DRX configuration in accordance with some other embodiments of the present disclosure.

FIG. 5 illustrates a schematic diagram showing sensing and DRX configuration in accordance with some other embodiments of the present disclosure. Similar to the example as shown in FIG. 4, in the example as shown in FIG. 5, the first terminal device 110 determines, based on the first SCI and the first reference signal received on the resource 341, a second resource 344 reserved by the second terminal device 120 for a third sidelink transmission.

Different from the example as shown in FIG. 4, in the example as shown in FIG. 5, the first terminal device 110 does not monitor the sidelink control channel during the off-duration 332 of the DRX cycle 330. Instead, if the first terminal device 110 determines that the second resource 344 is within the off-duration 332, the first terminal device 110 determines consecutive resources potentially reserved by the second terminal device 120 based on the first SCI received on the resource 341, the first reference signal, a start of the off-duration and an end of the resource selection window 310.

For example, the first terminal device 110 determines the resource reservation period $P_{rx}$ of the second terminal device 120 based on the first SCI received on the resource 341. Then, the first terminal device 110 determines consecutive resources potentially reserved by the second terminal device 120 based on a sum of the resource 341 and $P_{rx}$, a sum of the resource 341 and $2*P_{rx}$, . . . , a sum of the resource 341 and $Q*P_{rx}$, where $Q=\lceil T_{scal}/P_{rx} \rceil$, $T_{scal}$ represents a time duration from a start of the off-duration (represented by $T_{OFF}$ in FIG. 5) to an end of the resource selection window 310 (represented by $T_{END}$ in FIG. 5). In the example as shown in FIG. 5, the consecutive resources potentially reserved by the second terminal device 120 comprise resources 344, 345 and 346.

If the first terminal device 110 determines that at least one resource of the consecutive resources is in the resource selection window 310, the first terminal device 110 determines a resource in the resource selection window 310 that is different from the at least one resource as the available candidate resource. In the example as shown in FIG. 5, the at least one resource of the consecutive resources that is in the resource selection window 310 comprises the resource 346 (also referred to as a third resource). In this case, the first terminal device 110 determines a resource in the resource selection window 310 that is different from the resource 346 as the available candidate resource.

In some example embodiments, for any resource m within the off-duration, it is assumed that all the resources represented by m+P_allowed located within the resource selection window are reserved by the second terminal device 120, where P_allowed represents each of resource reservation periods that are preconfigured as allowed for the resource pool. In turn, the first terminal device 110 determines a resource in the resource selection window 310 that is different from the reserved resources as the available candidate resource. This will be described with reference to FIG. 6.

Figure 6:
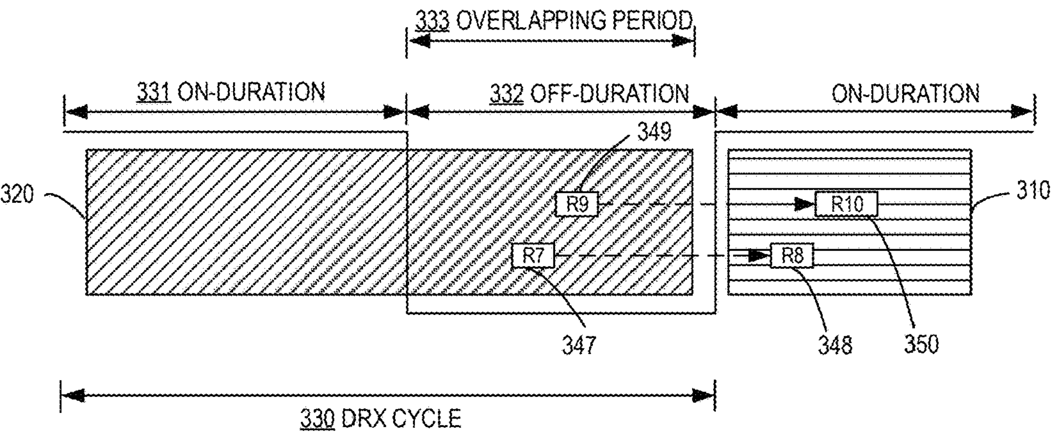
FIG. 6 illustrates a schematic diagram showing sensing and DRX configuration in accordance with still other embodiments of the present disclosure.

FIG. 6 illustrates a schematic diagram showing sensing and DRX configuration in accordance with still other embodiments of the present disclosure. In the example as shown in FIG. 6, the first terminal device 110 may determine at least one fourth resource based on a resource 347 within the off-duration 332 and at least one preconfigured resource reservation period. For example, the at least one preconfigured resource reservation period may comprise 10 ms, 20 ms, 30 ms and the like. The first terminal device 110 may determine consecutive resources potentially reserved by the second terminal device 120 based on sums of the resource 347 and each of the at least one preconfigured resource reservation period.

If the first terminal device 110 determines that the at least one fourth resource is in the resource selection window, the first terminal device 110 determines a resource in the resource selection window 310 that is different from the at least one fourth resource as the available candidate resource. In the example as shown in FIG. 6, the at least one fourth resource may comprise a resource 348. As such, the first terminal device 110 determines a resource in the resource selection window 310 that is different from the resource 348 as the available candidate resource.

In the example as shown in FIG. 6, the first terminal device 110 may also determine at least one fourth resource based on a resource 349 within the off-duration 332 and the at least one preconfigured resource reservation period. For example, the first terminal device 110 may determine consecutive resources potentially reserved by the second terminal device 120 based on sums of the resource 349 and each of the at least one preconfigured resource reservation period.

If the first terminal device 110 determines that the at least one fourth resource is in the resource selection window, the first terminal device 110 determines a resource in the resource selection window 310 that is different from the at least one fourth resource as the available candidate resource. In the example as shown in FIG. 6, the at least one fourth resource may also comprise a resource 350. As such, the first terminal device 110 determines a resource in the resource selection window 310 that is different from the resource 350 as the available candidate resource.

In some example embodiments, if the first terminal device 110 determines that a priority of data to be transmitted by the first terminal device 110 is higher than a threshold priority, the first terminal device 110 determines the at least one fourth resource.

In some other example embodiments, if the first terminal device 110 determines that a channel busy rate is lower than a threshold rate, the first terminal device 110 determines the at least one fourth resource.

In still other example embodiments, if the first terminal device 110 determines that the off-duration is less than a threshold duration, the first terminal device 110 determines the at least one fourth resource.

In yet other example embodiments, if the first terminal device 110 determines that the number of the at least one preconfigured resource reservation period is less than a threshold number, the first terminal device 110 determines the at least one fourth resource.

In some example embodiments, no SCI transmissions are allowed during the off-duration so that no missed reservation SCI detections occur during the off-duration. In such example embodiments, resource pools for power saving terminal devices are dedicatedly configured. For example, in case where the first terminal device 110 and the second terminal device 120 are power saving terminal devices, each of a first pool of resources for transmission and a second pool of resources for reception is configured for the first terminal device 110 and the second terminal device 120. DRX configuration is pool specific. In other words, the on-duration for the first pool is aligned with the on-duration for the second pool, and the off-duration for the first pool is aligned with the off-duration for the second pool.

In such example embodiments, the first terminal device 110 and the second terminal device 120 may only select one or more resources in the first pool for transmission and select one or more resources in the second pool for reception. This will be described with reference to FIG. 7.

Figure 7:
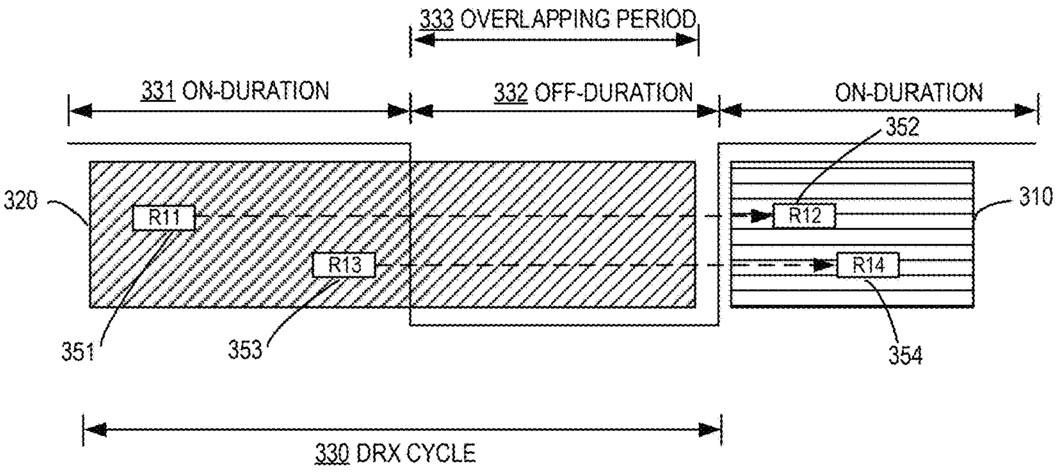
FIG. 7 illustrates a schematic diagram showing sensing and DRX configuration in accordance with still other embodiments of the present disclosure.

FIG. 7 illustrates a schematic diagram showing sensing and DRX configuration in accordance with still other embodiments of the present disclosure. In the example as shown in FIG. 7, the on-duration 331 is configured for the second pool and the off-duration 332 is configured for the second pool. The first terminal device 110 may receive the first SCI from the second terminal device 120 on a resource 351 or 353 in the second pool.

The on-duration 331 is also configured for the first pool (not shown) and the off-duration 332 is also configured for the first pool (not shown). The second terminal device 120 may transmit the first SCI on a resource in the first pool.

The first terminal device 110 may determine that a resource 352 is reserved by the second terminal device 120 based on the first SCI and the first reference signal received on the resource 351. As such, the first terminal device 110 determines a resource in the resource selection window 310 that is different from the resource 352 as the available candidate resource.

Alternatively, the first terminal device 110 may determine that a resource 354 is reserved by the second terminal device 120 based on the first SCI and the first reference signal received on the resource 352. As such, the first terminal device 110 determines a resource in the resource selection window 310 that is different from the resource 354 as the available candidate resource.

In some example embodiments, the on-duration 331 and the off-duration 332 are configured by using a first slot index with respect to a reference slot and a second slot index with respect to the reference slot, respectively.

In some example embodiments, the reference slot may be common to the first terminal device 110 and the second terminal device 120. In some example embodiments, the reference slot comprises a first starting slot of a starting system frame of a serving cell for the first terminal device 110 and the second terminal device 120. For example, the reference slot comprises slot #0 of the radio frame corresponding to System Frame Number (SFN) 0 of the serving cell. Alternatively, the reference slot comprises a second starting slot of a starting definite frame. For example, the reference slot comprises slot #0 of the radio frame corresponding to Definite Frame Number (DFN) 0.

In some example embodiments, for the first terminal device 110 and the second terminal device 120 configured with the DRX as described above, it is assumed that neither transmissions nor reception are allowed during the off-duration 331. Thus, no missed reservation SCI detections occur during the off-duration 331.

In some example embodiments, the first and second pools configured for power saving terminal devices are not allowed to be selected by non-power saving terminal devices. For example, if the third terminal device 130 in FIG. 1 is a non-power saving terminal device, the third terminal device 130 is not allowed to select any resource in the first and second pools.

In some example embodiments, for the first terminal device 110 and the second terminal device 120 configured with the DRX as described above, resource reservation periods less than the off-duration 331 are not allowed where the resource reservation periods are configured from sl-ResourceReservePeriodList-r16 of the resource pools.

In some example embodiments, if the first terminal device 110 determines that an overlapping period exists between an off-duration of a DRX cycle and a sensing window, in order to determine an available candidate resource for a sidelink transmission, the first terminal device 110 may take information for resource selection received from other terminal device into account. This will be described with reference to FIG. 8.

FIG. 8 illustrates an example signaling chart showing an example process 800 for resource selection in accordance with some other embodiments of the present disclosure. As shown in FIG. 8, the process 800 may involve the first terminal device 110 and the third terminal device 130 as shown in FIG. 1. It is to be understood that the process 800 may include additional acts not shown and/or may omit some acts as shown, and the scope of the present disclosure is not limited in this regard. In addition, it will be appreciated that, although primarily presented herein as being performed serially, at least a portion of the acts of the process 800 may be performed contemporaneously or in a different order than as presented in FIG. 8.

As shown in FIG. 8, the first terminal device 110 determines (810) whether an overlapping period exists between an off-duration of a DRX cycle and a sensing window.

If the first terminal device 110 determines that the overlapping period exists, the first terminal device 110 determines (820) an available candidate resource in a resource selection window for a first sidelink transmission based on information for resource selection received from the third terminal device 130.

In some example embodiments, optionally, if the first terminal device 110 determines that the overlapping period exists, the first terminal device 110 transmits (830) to the third terminal device 130 a request for the information for resource selection. In turn, the first terminal device 110 receives (840) a response to the request from the third terminal device 130. The response comprises the information for resource selection.

In some example embodiments, the request comprises configuration information concerning DRX for the first terminal device 110.

In some example embodiments, if the first terminal device 110 determines that a priority of data to be transmitted by the first terminal device 110 is higher than a threshold priority, the first terminal device 110 transmits the request.

In some example embodiments, if the first terminal device 110 determines that a ratio of a first number of at least one candidate sensing occasion during the overlapping period to a total number of candidate sensing occasions in the sensing window is higher than a threshold ratio, the first terminal device 110 transmits the request.

In some example embodiments, optionally, before determining whether the overlapping period exists, the first terminal device 110 receives the information for resource selection from the third terminal device 120.

In some example embodiments, in order to determine an available candidate resource in the resource selection window for a sidelink transmission, the first terminal device 110 performs sensing during a short sensing window after the on-duration starts. This will be described with reference to FIGS. 9 and 10.

FIG. 9 illustrates an example signaling chart showing an example process 900 for resource selection in accordance with still other embodiments of the present disclosure. As shown in FIG. 9, the process 900 may involve the first terminal device 110 and the second terminal device 120 as shown in FIG. 1. It is to be understood that the process 900 may include additional acts not shown and/or may omit some acts as shown, and the scope of the present disclosure is not limited in this regard. In addition, it will be appreciated that, although primarily presented herein as being performed serially, at least a portion of the acts of the process 900 may be performed contemporaneously or in a different order than as presented in FIG. 9.

As shown in FIG. 9, the first terminal device 110 determines (910) whether an overlapping period exists between an off-duration of a DRX cycle and a sensing window.

If the first terminal device 110 determines that the overlapping period exists, the first terminal device 110 receives (920), from the second terminal device 120, SCI and a reference signal in a second sensing window. The second sensing window is within an on-duration of a second DRX cycle subsequent to the first DRX cycle.

The first terminal device 110 determines (930) an available candidate resource in a resource selection window for a first sidelink transmission based at least on the first SCI and the reference signal. The resource selection window is subsequent to the second sensing window and within the on-duration.

Figure 10:
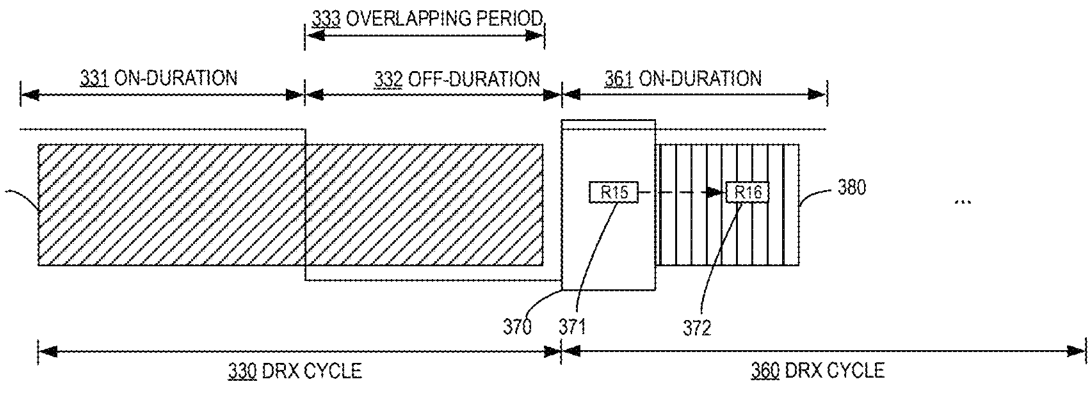
FIG. 10 illustrates a schematic diagram showing partial sensing and DRX configuration in accordance with yet other embodiments of the present disclosure.

FIG. 10 illustrates a schematic diagram showing partial sensing and DRX configuration in accordance with yet other embodiments of the present disclosure. In the example as shown in FIG. 10, if the first terminal device 110 determines that the overlapping period 333 exists between the off-duration 332 of the DRX cycle 330 and the sensing window 320 (also referred to as a first sensing window 320), the first terminal device 110 receives, from the second terminal device 120, the SCI and the reference signal on a resource 371 in a sensing window 370 (also referred to as a second sensing window 370). The second sensing window 370 is within an on-duration 361 of a DRX cycle 360 subsequent to the DRX cycle 330.

In turn, if the first terminal device 110 determines that a resource 372 in a resource selection window 380 is reserved by the second terminal device 120 based on the received SCI and reference signal, the first terminal device 110 may determine a resource in the resource selection window 380 that is different from the resource 372 as the available candidate resource. The resource selection window 380 is subsequent to the second sensing window 370 and within the on-duration 361.

In some example embodiments, a length of the second sensing window 370 is associated with at least one of the following: a packet delay budget for the first terminal device 110, or a priority of data to be transmitted by the first terminal device 110.

In some example embodiments, a sensing result of the first terminal device 110 during and after the off-duration 332 could be the same as a sensing result derived during the on-duration 331.

Figure 11:
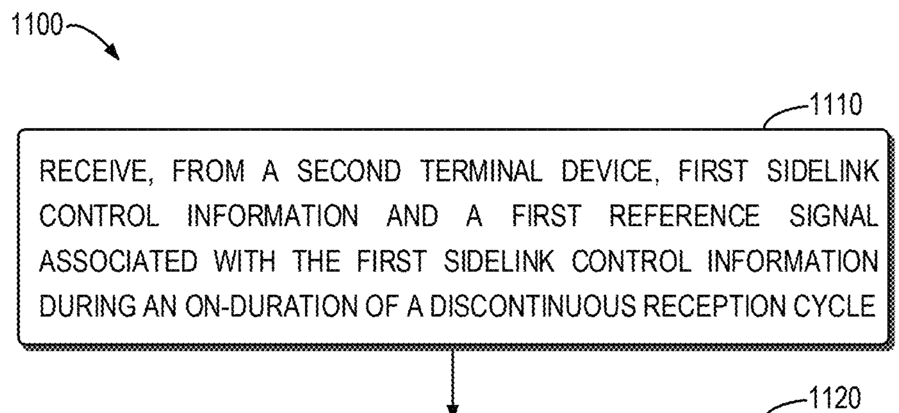
FIG. 11 illustrates a flowchart of an example method in accordance with some embodiments of the present disclosure.

FIG. 11 illustrates a flowchart of an example method 1100 in accordance with some embodiments of the present disclosure. For example, the method 1100 can be performed at the first terminal device 110 as shown in FIG. 1. It is to be understood that the method 1100 may include additional blocks not shown and/or may omit some blocks as shown, and the scope of the present disclosure is not limited in this regard.

At block 1110, the first terminal device 110 receives, from the second terminal device 120, first SCI and a first reference signal associated with the first SCI during an on-duration of a DRX cycle. At block 1120, if the first terminal device 110 determines that an overlapping period exists between an off-duration of the DRX cycle and a sensing window, the first terminal device 110 determines an available candidate resource in a resource selection window for a first sidelink transmission based at least on the first SCI and the first reference signal.

Additionally, if the first terminal device 110 determines that the overlapping period exists, the first terminal device 110 provides, from a physical layer of the first terminal device 110 to a protocol layer, an indication that at least one candidate sensing occasion during the overlapping period is unavailable. The protocol layer is higher than the physical layer.

In some example embodiments, the first terminal device 110 may determine, based on the first SCI and the first reference signal, a first resource reserved by the second terminal device 120 for a second sidelink transmission. If the first terminal device 110 determines that the first resource is within the off-duration, the first terminal device 110 receives second SCI and a second reference signal associated with the second SCI on the first resource from the second terminal device 120. In turn, the first terminal device 110 may determine the available candidate resource based on the second SCI and the second reference signal.

In some example embodiments, the first terminal device 110 may keep in an active status from a start of the off-duration to an end of the first resource and receive the second SCI and the second reference signal in the active status.

Alternatively, in some example embodiments, the first terminal device 110 may switch from an inactive status to an active status on the first resource and receive the second SCI and the second reference signal in the active status.

In some example embodiments, the first terminal device 110 may determine, based on the first SCI and the first reference signal, a second resource reserved by the second terminal device 120 for a third sidelink transmission. If the first terminal device 110 determines that the second resource is within the off-duration, the first terminal device 110 may determine a third resource based on the first SCI, the first reference signal, a start of the off-duration and an end of the resource selection window. If the first terminal device 110 determines that the third resource is in the resource selection window, the first terminal device 110 may determine a resource in the resource selection window that is different from the third resource as the available candidate resource.

In some example embodiments, the first terminal device 110 may determine at least one fourth resource based on a fifth resource within the off-duration and at least one preconfigured resource reservation period. If the first terminal device 110 determines that the at least one fourth resource is in the resource selection window, determines a resource in the resource selection window that is different from the at least one fourth resource as the available candidate resource.

In some example embodiments, if the first terminal device 110 determines that a priority of data to be transmitted by the first terminal device 110 is higher than a threshold priority, the first terminal device 110 determines the at least one fourth resource.

In some example embodiments, if the first terminal device 110 determines that a channel busy rate is lower than a threshold rate, the first terminal device 110 determines the at least one fourth resource.

In some example embodiments, if the first terminal device 110 determines that the off-duration is less than a threshold duration, the first terminal device 110 determines the at least one fourth resource.

In some example embodiments, if the first terminal device 110 determines that the number of the at least one preconfigured resource reservation period is less than a threshold number, the first terminal device 110 determines the at least one fourth resource.

In some example embodiments, the first SCI may be transmitted on a fifth resource in a first pool of resources configured for the first terminal device 110 and the second terminal device 120. In such example embodiments, the first terminal device 110 may receive the first SCI on a sixth resource in a second pool of resources configured for the first terminal device 110 and the second terminal device 120. Each of the on-duration and the off-duration is configured for the first and second pools.

In some example embodiments, the on-duration and the off-duration may be configured by using a first slot index with respect to a reference slot and a second slot index with respect to the reference slot, respectively.

In some example embodiments, the reference slot may comprise a first starting slot of a starting system frame of a serving cell for the first terminal device 110 and the second terminal device 120. Alternatively, the reference slot may comprise a second starting slot of a starting definite frame.

Figure 12:
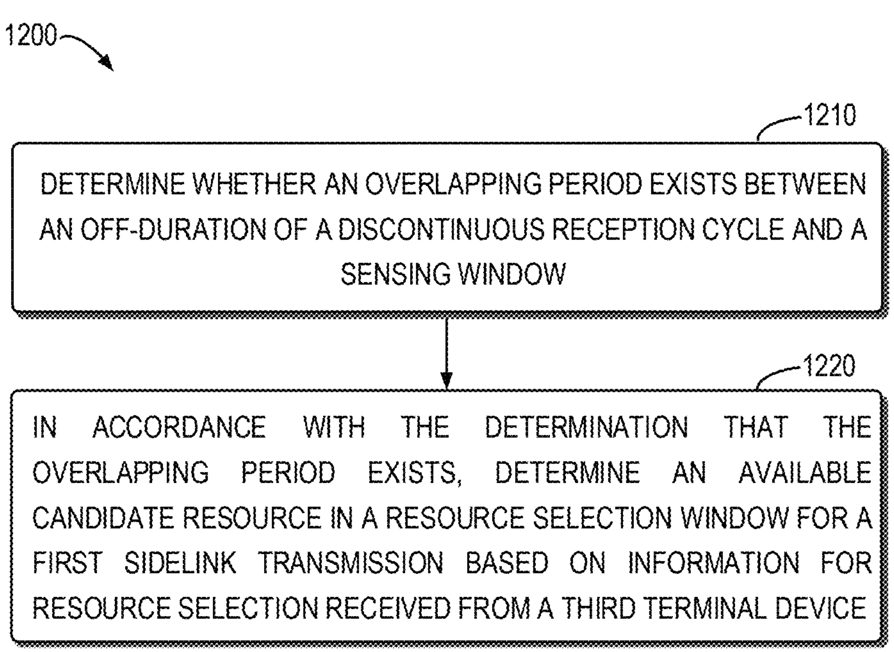
FIG. 12 illustrates a flowchart of an example method in accordance with some other embodiments of the present disclosure.

FIG. 12 illustrates a flowchart of an example method 1200 in accordance with some embodiments of the present disclosure. For example, the method 1200 can be performed at the first terminal device 110 as shown in FIG. 1. It is to be understood that the method 1200 may include additional blocks not shown and/or may omit some blocks as shown, and the scope of the present disclosure is not limited in this regard.

At block 1210, the first terminal device 110 determines whether an overlapping period exists between an off-duration of a DRX cycle and a sensing window.

At block 1220, if the first terminal device 110 determines that the overlapping period exists, the first terminal device 110 determines an available candidate resource in a resource selection window for a first sidelink transmission based on information for resource selection received from a third terminal device 130.

In some example embodiments, if the first terminal device 110 determines that the overlapping period exists, the first terminal device 110 transmits to the third terminal device 130 a request for the information for resource selection, and receives a response to the request from the third terminal device 130. The response comprises the information for resource selection.

In some example embodiments, the request may comprise configuration information concerning DRX for the first terminal device 110.

In some example embodiments, if the first terminal device 110 determines that a priority of data to be transmitted by the first terminal device 110 is higher than a threshold priority, the first terminal device 110 transmits the request.

In some example embodiments, if the first terminal device 110 determines that a ratio of a first number of at least one candidate sensing occasion during the overlapping period to a total number of candidate sensing occasions in the sensing window is higher than a threshold ratio, the first terminal device 110 transmits the request.

Additionally, in some example embodiments, before determining whether the overlapping period exists, the first terminal device 110 receives the information for resource selection from the third terminal device 130.

Figure 13:
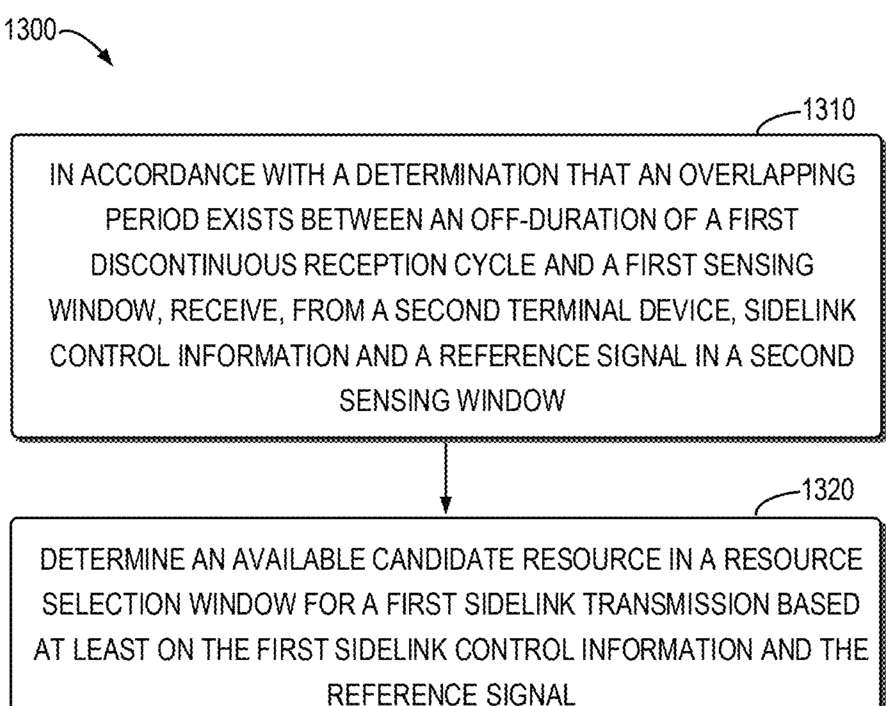
FIG. 13 illustrates a flowchart of an example method in accordance with still other embodiments of the present disclosure.

FIG. 13 illustrates a flowchart of an example method 1300 in accordance with some embodiments of the present disclosure. For example, the method 1300 can be performed at the first terminal device 110 as shown in FIG. 1. It is to be understood that the method 1300 may include additional blocks not shown and/or may omit some blocks as shown, and the scope of the present disclosure is not limited in this regard.

At block 1310, if the first terminal device 110 determines that an overlapping period exists between an off-duration of a first DRX cycle and a first sensing window, the first terminal device 110 receives, from a second terminal device 120, SCI and a reference signal in a second sensing window, the second sensing window is within an on-duration of a second DRX cycle subsequent to the first DRX cycle.

At block 1320, if the first terminal device 110 determines an available candidate resource in a resource selection window for a first sidelink transmission based at least on the first SCI and the reference signal. The resource selection window is subsequent to the second sensing window and within the on-duration.

In some example embodiments, a length of the second sensing window may be associated with a packet delay budget for the first terminal device 110. Alternatively, the length of the second sensing window may be associated with a priority of data to be transmitted by the first terminal device 110.

Figure 14:
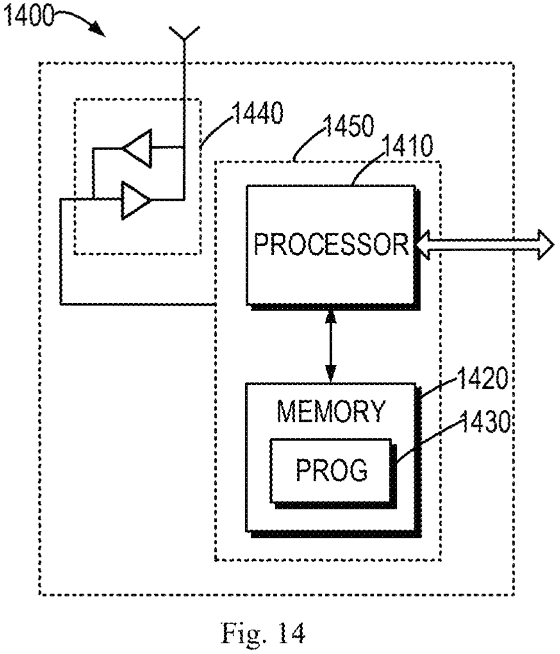
FIG. 14 is a simplified block diagram of a device that is suitable for implementing embodiments of the present disclosure.

FIG. 14 is a simplified block diagram of a device 1400 that is suitable for implementing embodiments of the present disclosure. The device 1400 can be considered as a further example implementation of the terminal device 110, 120, or 130 as shown in FIG. 1. Accordingly, the device 1400 can be implemented at or as at least a part of the terminal device 110 or 120.

As shown, the device 1400 includes a processor 1410, a memory 1420 coupled to the processor 1410, a suitable transmitter (TX) and receiver (RX) 1440 coupled to the processor 1410, and a communication interface coupled to the TX/RX 1440. The memory 1410 stores at least a part of a program 1430. The TX/RX 1440 is for bidirectional communications. The TX/RX 1440 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1430 is assumed to include program instructions that, when executed by the associated processor 1410, enable the device 1400 to operate in accordance with the embodiments of the present disclosure, as discussed herein with reference to FIGS. 1 to 13. The embodiments herein may be implemented by computer software executable by the processor 1410 of the device 1400, or by hardware, or by a combination of software and hardware. The processor 1410 may be configured to implement various embodiments of the present disclosure. Furthermore, a combination of the processor 1410 and memory 1420 may form processing means 1450 adapted to implement various embodiments of the present disclosure.

The memory 1420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1420 is shown in the device 1400, there may be several physically distinct memory modules in the device 1400. The processor 1410 may be of any type suitable to the local technical network, and may include one or more of general purpose computers, special purpose computers, microprocessors, digital signal processors (DSPs) and processors based on multicore processor architecture, as non-limiting examples. The device 1400 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out any of the processes or methods as described above with reference to FIGS. 2, 8, 9, 11-13. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote readable media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for a first terminal device communications, the method comprising:

performing reception of Physical Sidelink Control Channel and (RSRP) measurement only on a sensing occasion from slots in a discontinuous reception (DRX) inactive time of a DRX cycle; and determining a resource for a sidelink transmission based on the Physical Sidelink Control Channel and the RSRP measurement.

2. A terminal device, comprising:

a processor; and a memory coupled to the processor and storing instructions thereon, the instructions, when executed by the processor, causing the terminal device to perform a method comprising:

performing reception of Physical Sidelink Control Channel and (RSRP) measurement only on a sensing occasion from slots in a discontinuous reception (DRX) inactive time of a DRX cycle; and determining a resource for a sidelink transmission based on the Physical Sidelink Control Channel and the RSRP measurement.

* * * * *